United States Patent [19]

Schneider

[11] 4,155,797
[45] May 22, 1979

[54] COMPOSITE SEPARABLE STRAND WINDING FORM

[75] Inventor: William A. Schneider, Valparaiso, Ind.

[73] Assignee: Owens-Corning Fiberglas Corporation, Toledo, Ohio

[21] Appl. No.: 829,747

[22] Filed: Sep. 1, 1977

[51] Int. Cl.² .............................................. B65H 81/00
[52] U.S. Cl. .................................... 156/433; 156/180; 156/443; 242/7.01
[58] Field of Search ............... 156/180, 166, 172, 169, 156/173, 175, 433, 455, 441, 443; 269/321 CF; 140/92.1, 92.2; 242/7.02, 7.14, 115, 7.09, 47, 701; 16/110 R, 125; 220/95

[56] References Cited

U.S. PATENT DOCUMENTS

| 2,743,508 | 5/1956 | Isaacson | 140/92.2 |
| 3,086,562 | 4/1963 | Price | 140/92.2 |
| 3,387,634 | 6/1968 | Hilsenberg | 140/92.2 |
| 3,697,346 | 10/1972 | Van Dorn et al. | 156/173 |

Primary Examiner—Michael W. Ball
Attorney, Agent, or Firm—Ronald C. Hudgens; Patrick P. Pacella; Paul J. Rose

[57] ABSTRACT

A winding form includes a mounting block, a pair of strand guide members, a pair of retaining plates, and means removably securing one of the strand guide members and one of the retaining plates to each of two opposite ends of the block.

12 Claims, 10 Drawing Figures ated along opposite sides of another face of the block

COMPOSITE SEPARABLE STRAND WINDING FORM

This invention relates generally to non-corrosive lifting lugs for tanks, and more particularly to a composite separable form for winding a continuous resin-impregnated strand to produce such a lug.

An object of the invention is to provide such a winding form.

Figure 1:
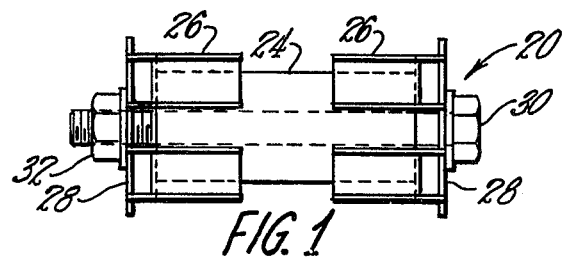
FIG. 1 is a plan view of the assembled winding form of the invention.
Figure 3:
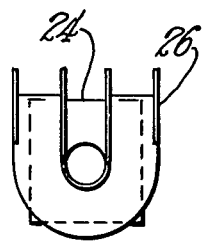
FIG. 3 is an end elevational view taken from the left-hand side of FIG. 2, with certain parts omitted.
Figure 2:
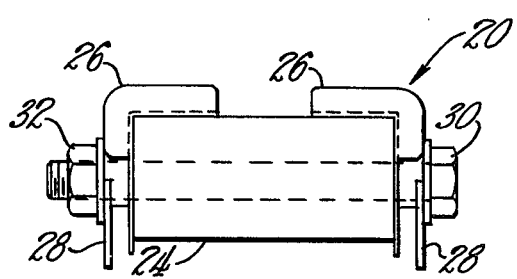
FIG. 2 is a front elevational view of the winding form FIG. 1.
Figure 4:
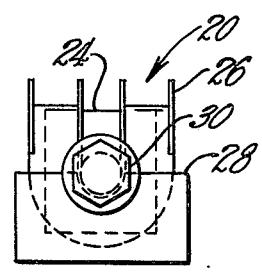
FIG. 4 is an end elevational view taken from the right hand side of FIG. 2.
Figure 9:
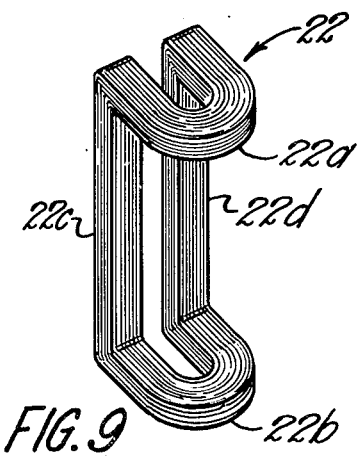
FIG. 9 is a perspective view of a lifting lug produced on the winding form of FIGS. 1 and 2.

With respect to the drawings, FIGS. 1, 2, and 4 show a composite separable winding form 20 constructed in accordance with the invention and useful for producing a tank lifting lug 22 shown in FIG. 9. The lifting lug 22 is more fully described in the copending application of Mark E. Greenwood, Ser. No. 829,748, filed Sept. 1, 1977.

The winding form 20 includes a mounting block 24, a pair of strand guide members 26, a pair of retaining plates 28, and means removably securing a member 26 and a plate 28 to each of two opposite end portions of the block 24. The securing means is shown as a bolt 30 and a nut 32, although other securing means could be used. The block 24 is longitudinally apertured to receive the bolt 30.

Figure 7:
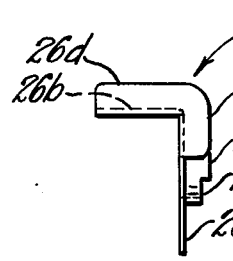
FIGS. 7 and 8 are views of a guide member of the winding form of FIGS. 1 and 2, taken at right angles to each other.
Figure 8:
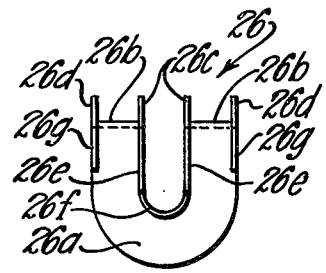

A strand guide member 26 is more clearly shown in FIGS. 7 and 8 and includes a generally flat, U-shaped body portion 26a having a pair of bent free end portions 26b extending substantially at right angles thereto. Each end portion 26b is provided with an inner flange 26c and an outer flange 26d whereby a strand guiding channel is defined. The flanges 26c are joined to an inner U-shaped flange 26e on the U-shaped body portion 26a, the U-shaped flange 26e having a recess 26f in a lower bright portion thereof for a purpose hereinafter described. The flanges 26d are joined respectively to outer flange portions 26g on the body portion 26a adjacent upper ends of the leg portions thereof.

Figure 5:
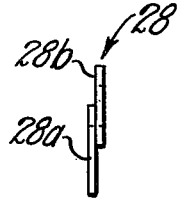
FIGS. 5 and 6 are views of a retaining plate and mounting washer assembly of the winding form of FIGS. 1 and 2, taken at right angles to each other.
Figure 6:
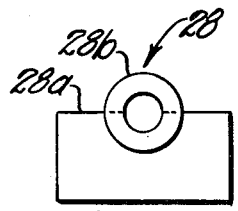

A strand retaining plate 28 is more clearly shown in FIGS. 5 and 6 and includes a generally rectangular plate portion 28a and a mounting washer portion 28b comprising a washer welded on the lower half of one side to an upper central portion of an adjacent side of the plate portion 28a. The upper central portion of the plate portion 28a is recessed to conform with the inner periphery of the washer portion 28b for reception of the bolt 30. In the assembled strand winding form 20, the upper half of the washer portion 28b of each retaining plate 28 engages the inner U-shaped flange 26e of the respective guide member 26, and the plate portion 28a is received in the recess 26f.

The lifting lug 22 is produced by manually winding a continuous resin-impregnated strand of glass filaments on the strand winding form 20, clearance between the flange portions 26g and the plate portion 28a at each end of the form enabling winding on the inner sides of the plate portions 28a to form the U-shaped portions of the lug. In a preferred procedure before winding is started, two pieces of tape are applied to the winding form 20 at the end portions 26b bridging the gap between the guide members 26. After curing of the resin in the wound lug, the composite form 20 is disassembled to remove the lug 22. Removal of the bolt 30 allows the block 24 to be pulled out from the bottom of the form 20. The guide members 26 may then be moved toward each other to release the U-shaped portions of the lug 22.

Figure 10:
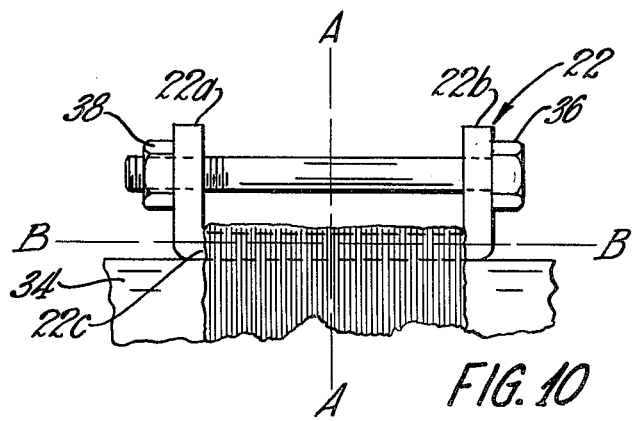
FIG. 10 is a fragmentary view of a tank having the lifting lug of FIG. 9 mounted thereon.

FIG. 10 shows a lug 22 secured to a tank 34 and provided with a bolt 36 secured in position by a nut 38. A hook or cable (not shown) is applied to the bolt 36 for a lifting operation on the tank 34. The lug 22 includes a pair of generally flat U-shaped portions 22a and 22b substantially parallel to a first reference plane represented by line A—A in FIG. 10 and a pair of straight connecting portions 22c and 22d parallel to each other and to a second reference plane perpendicular to the first reference plane and represented by the line B—B.

Various modifications may be made in the structure shown and described without departing from the spirit and scope of the invention.

I claim:

1. A composite separable strand winding form comprising a mounting block and a pair of strand guide members removably secured to the block respectively adjacent a pair of opposite end faces thereof, each strand guide member including a generally flat, generally U-shaped body portion substantially parallel to and aligned with that of the other and a generally U-shaped flange on an inner periphery of the U-shaped body portion and projecting away from the block, at least two bent free end portions extending substantially perpendicularly from either or both U-shaped body portions along opposite sides of another face of the block toward the other of the strand guide members and wherein at least said two bent free end portions have flanges along the inner edges thereof.

2. A strand winding form as claimed in claim 1 wherein at least one of said bent free end portions has a flange on an outer edge thereof.

3. A strand winding form as claimed in claim 1 wherein each of the bent free end portions has a flange on an outer edge thereof.

4. A strand winding form as claimed in claim 1 wherein the U-shaped body portion of each of the strand guide members has a bent free end portion extending substantially perpendicularly therefrom along another face of the block toward the other of the strand guide members.

5. A strand winding form as claimed in claim 4 wherein the bent free end portion of each of the strand guide members has a flange on an inner edge thereof.

6. A strand winding form as claimed in claim 5 wherein the bent free end portion of each of the strand guide members has a flange on an outer edge thereof.

7. A strand winding form as claimed in claim 1 wherein the U-shaped body portion of each of the strand guide members has a pair of said bent free end portions extending substantially perpendicularly therefrom along another face of the block toward the other of the strand guide members.

8. A strand winding form as claimed in claim 7 wherein each of the bent free end portions of each of the strand guide members has a flange on an inner edge thereof.

9. A strand winding form as claimed in claim 8 wherein each of the bent free end portions of each of the strand guide members has a flange on an outer edge thereof.

10. A strand winding form as claimed in claim 1 including a pair of strand retaining plates removably secured respectively against the U-shaped flanges of the strand guide members.

11. A strand winding form as claimed in claim 10 wherein each strand retaining plate includes a plate portion and a mounting washer portion welded on the lower half of one side to an upper central portion of an adjacent side of the plate portion, and wherein the U-shaped flanges are recessed in lower bright portions thereof or respectively receiving the plate portions of the strand retaining plates.

12. A strand winding form as claimed in claim 11 wherein the U-shaped body portion of each of the strand guide members has a pair of flange portions on an outer periphery adjacent upper ends of the leg portions thereof.

* * * * *